United States Patent [19]

Stoesser et al.

[11] Patent Number: 5,072,257
[45] Date of Patent: Dec. 10, 1991

[54] VACUUM FRAME HINGE

[75] Inventors: William J. Stoesser, Menlo Park; Peter G. Dockree, San Jose, both of Calif.

[73] Assignee: Stoesser Industries, Mountain View, Calif.

[21] Appl. No.: 587,261

[22] Filed: Sep. 21, 1990

[51] Int. Cl.⁵ .......................................... G03B 27/20
[52] U.S. Cl. ..................................................... 355/93
[58] Field of Search ...................... 355/91, 93, 94, 87, 355/76

[56] References Cited

U.S. PATENT DOCUMENTS

| | | | |
|---|---|---|---|
| 1,493,677 | 5/1924 | Jones | 355/91 |
| 3,126,192 | 3/1964 | Stein | 248/362 |
| 3,625,611 | 12/1971 | Orr et al. | 355/87 |
| 3,634,009 | 1/1972 | Van Dusen et al. | 355/93 |
| 3,687,552 | 8/1972 | Almond et al. | 355/113 |
| 3,771,870 | 11/1973 | Taylor | 355/91 |
| 4,032,233 | 6/1977 | Oscarsson et al. | 355/91 |
| 4,262,594 | 4/1981 | Landsman | 101/382 MV |
| 4,529,303 | 7/1985 | Ternes | 355/91 |
| 4,563,085 | 1/1986 | Ternes | 355/132 |
| 4,636,067 | 1/1987 | Richards, Sr. | 355/91 |
| 4,664,511 | 5/1987 | Carlson et al. | 355/91 |
| 4,676,633 | 6/1987 | Burgess et al. | 355/91 |
| 4,827,316 | 5/1989 | Brown | 355/79 |

OTHER PUBLICATIONS

Byers Corporation brochure, "PHASE SYSTEM Specifications", effective 12/1/89, 4 pp.

Primary Examiner—Richard A. Wintercorn
Attorney, Agent, or Firm—Flehr, Hohbach, Test, Albritton & Herbert

[57] ABSTRACT

A vacuum frame apparatus and method for maintaining registration of graphic material to be exposed to light having a surface on a base for supporting graphic materials which remains stationary with respect to the base and having a cover which moves with respect to the stationary support surface into engagement with graphic materials to sandwich the same between the cover and support surface.

15 Claims, 4 Drawing Sheets

FIG. 1
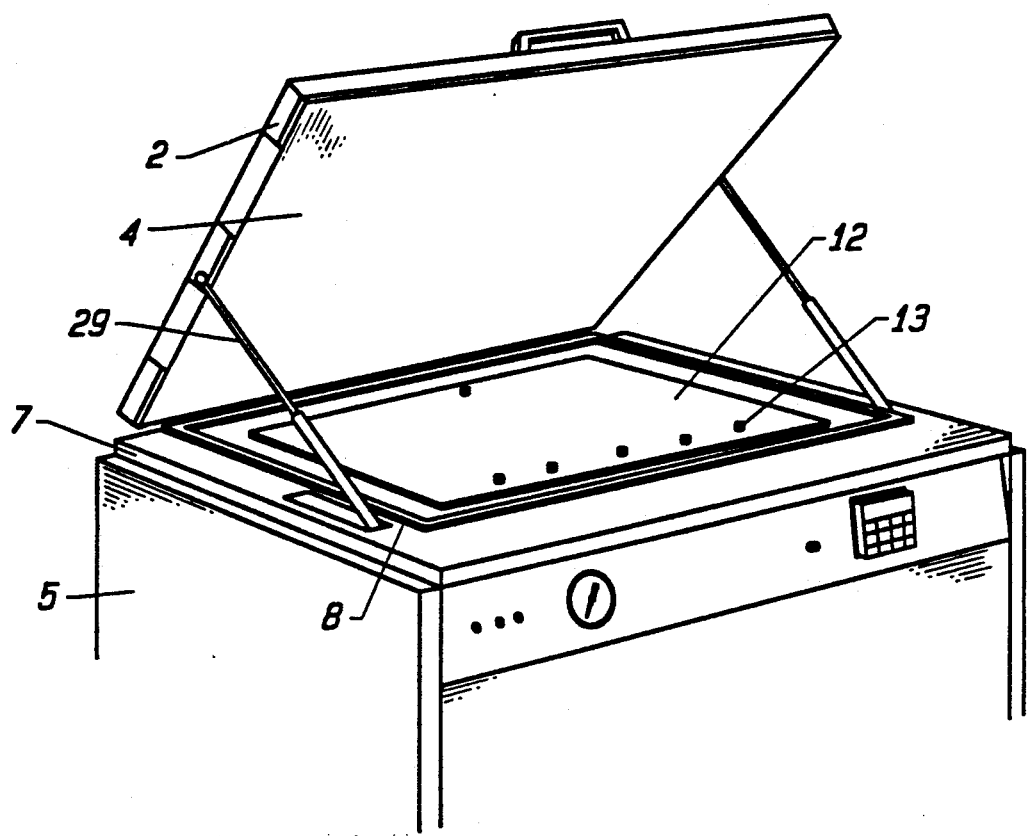
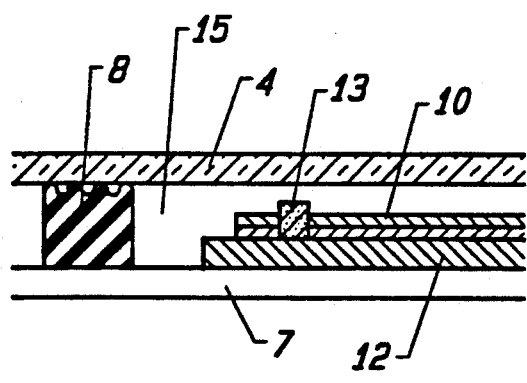
FIG. 2
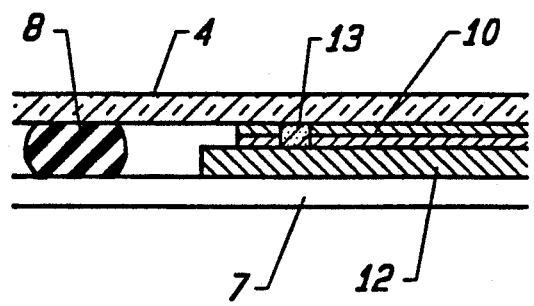
FIG. 3

VACUUM FRAME HINGE

FIELD OF THE INVENTION

This invention relates generally to printing, and more particularly, to a vacuum frame apparatus and a method for maintaining registration of a plurality of sheets of graphic material to be exposed to light.

BACKGROUND OF THE INVENTION

In the printing industry, pictures and other non-text and text material (herein "graphic material") to be printed are formed by registering a negative with a printing plate and then exposing the same to light to form the desired image on the plate. A vacuum frame consisting of a transparent cover and a base having a surface for supporting a plurality of sheets of graphic material in registration, e.g., a photographic negative, and a printing plate, are used for this purpose. The plate is made by first placing the sheets in registration on the base surface, closing the cover, and then exposing the registered sheets of graphic material to light through the cover.

The cover is generally mounted to the base and moves with pivotal motion with respect to the support surface. Graphic material is placed upon the base support surface in registration, and the cover is lowered to meet the base support surface. After the cover is placed in initial contact with the support surface, a vacuum pump is utilized to evacuate the air from between the cover and the base support surface. In a typical prior art arrangement, the vacuum causes the base support surface to be raised to the cover, and thereby raises the graphic material to be firmly sandwiched between the cover and the base support surface. It is thus positioned for subsequent exposure to light. U.S. Pat. Nos. 3,625,611; 4,676,633; and 4,827,316 describe typical vacuum frames and their operation.

While vacuum frames provide means for firmly and positively holding graphic material in place after evacuation has been completed, it is not unusual for registered sheets of graphic material to lose their registration while the vacuum is being applied. Because the graphic material rests upon the base support surface and the base support surface is raised to meet the cover upon evacuation, the graphic material moves while the base support surface moves. The movement causes the registration of the graphic material to be disturbed in an unpredictable manner.

SUMMARY OF THE INVENTION

An object of the broad aspects of the present invention is realized by including as part of a vacuum frame apparatus, means for guiding the movement of the cover generally linearly and perpendicularly to the base support surface as it is moved into engagement with graphic material. Moreover, another object of this invention is realized in that, upon evacuation, the base support surface remains stationary and the cover moves and neither it nor the base surface disturbs the registration of graphic material. This invention also includes a method for maintaining registration of graphic material.

After the graphic material is placed upon the base support surface, the cover is initially lowered, being directionally guided by pivotal motion relative to the support surface. (Directions such as "lowering," "above," "below," etc. are not intended as limitations, but are used only to denote relative positioning). The pivotal motion of the cover is enabled by the rotational freedom of a common shaft type hinge. The base of the vacuum frame remains stationary while the cover moves. Because the support surface of the base remains stationary, the plurality of sheets remains stationary with respect to the base.

When the cover is lowered, initial contact with a rubber seal at the support surface's perimeter is made. A vacuum pump is engaged to evacuate the air from the space between the cover and the support surface. Under the force of the vacuum, the cover is pressed against the support surface with generally linear motion—such cover is guided by the hinge, generally linearly and perpendicular to the base supporting surface as it is driven down. The guidance by the hinge provides for generally linear motion of the cover. The registered graphic material is therefore sandwiched between the cover and the base supporting surface without itself being moved. Thus, the registration is not disturbed.

Most desirably, a hinge is provided that is so attached to the vacuum frame base and the cover, it enables both pivotal motion relative to the support surface and generally linear and perpendicular motion relative to the support surface. This configuration consolidates several functions into one device.

BRIEF DESCRIPTION OF THE DRAWINGS

Additional objects and features of the invention will be more readily apparent from the following detailed description and appended claims when taken in conjunction with the drawings, in which:

FIG. 1 is a perspective view of a preferred embodiment of a vacuum frame apparatus incorporating the present invention with the cover in its elevated position ready to receive graphic material for exposure to light;

FIG. 2 is a cross sectional view of the apparatus of FIG. 1, showing the space between the cover and the support surface after the cover is initially lowered and before the vacuum is applied;

FIG. 3 is a similar cross sectional view to that of FIG. 2, illustrating the cover lowered and graphic material pressed against the underneath side of the same under the force of a vacuum;

DESCRIPTION OF THE PREFERRED EMBODIMENT

Figure 4:
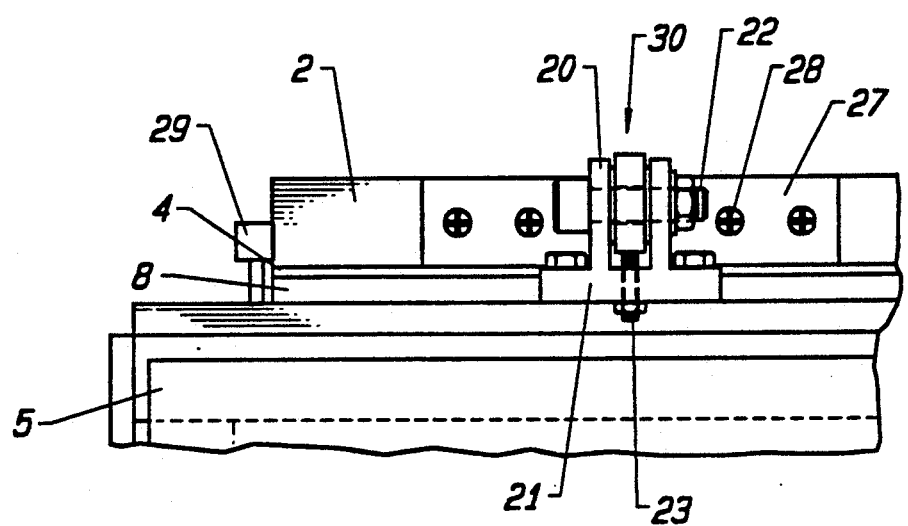
FIG. 4 is a partial back view of the apparatus showing the hinge connected to the base and to the cover.

Referring to FIG. 1, a vacuum frame apparatus incorporating the invention is shown in perspective, which apparatus is for maintaining alignment of graphic material to be exposed to light. The apparatus includes a cover 2 shown in an elevated position so that the apparatus is ready to receive graphic material 10 (not shown in FIG. 1, see FIGS. 2 & 3), in the form of two sheets to be maintained in registration. The number of sheets of graphic material is variable. The graphic material 10 is placed upon registration board 12 and is aligned with registration pins 13. Registration board 12 sits upon support surface 7 of base 5, and rubber seal 8 lines the perimeter of support surface 7. After the graphic material 10 is aligned, cover 2 is initially lowered with pivotal motion until glass plate 4, which is on the underside of cover 2, comes into contact with rubber seal 8. The pivotal motion of cover 2 is enabled by shaft type hinge 26 which is incorporated as part of hinge 30 as shown in FIG. 4, which is connected to cover 2 and base 5. The hinge of the preferred embodiment is referred to herein as hinge 30.

The hinge 30, depicted in FIGS. 4, 5, 6 and 7 is a form of means for guiding movement of the cover 2 generally linearly and perpendicular relative to the support surface 7 into engagement with graphic material 10. It is sandwiched between cover 2 and registration board 12 and supported by support surface 7 without disturbing the registration of the same.

The construction of hinge 30 is preferred because it provides both generally linear motion perpendicular to cover 2 relative to support surface 7 and pivotal guidance of cover 2 relative to support surface 7. However, the two functions incorporated into the hinge 30, could be provided by separate units and the vacuum frame apparatus would still be operational in the same manner as described herein. Furthermore, any number of hinges or other structures may be utilized to effect the purpose of providing linear motion of cover 2 perpendicular to support surface 7. The preferred embodiment as illustrated in FIG. 1 shows two hinges attached to the back portion of the apparatus. An embodiment wherein the hinges described herein are fewer in number, or greater in number, or are attached simultaneously to a side of the vacuum frame apparatus, can also be envisioned.

Figure 5:
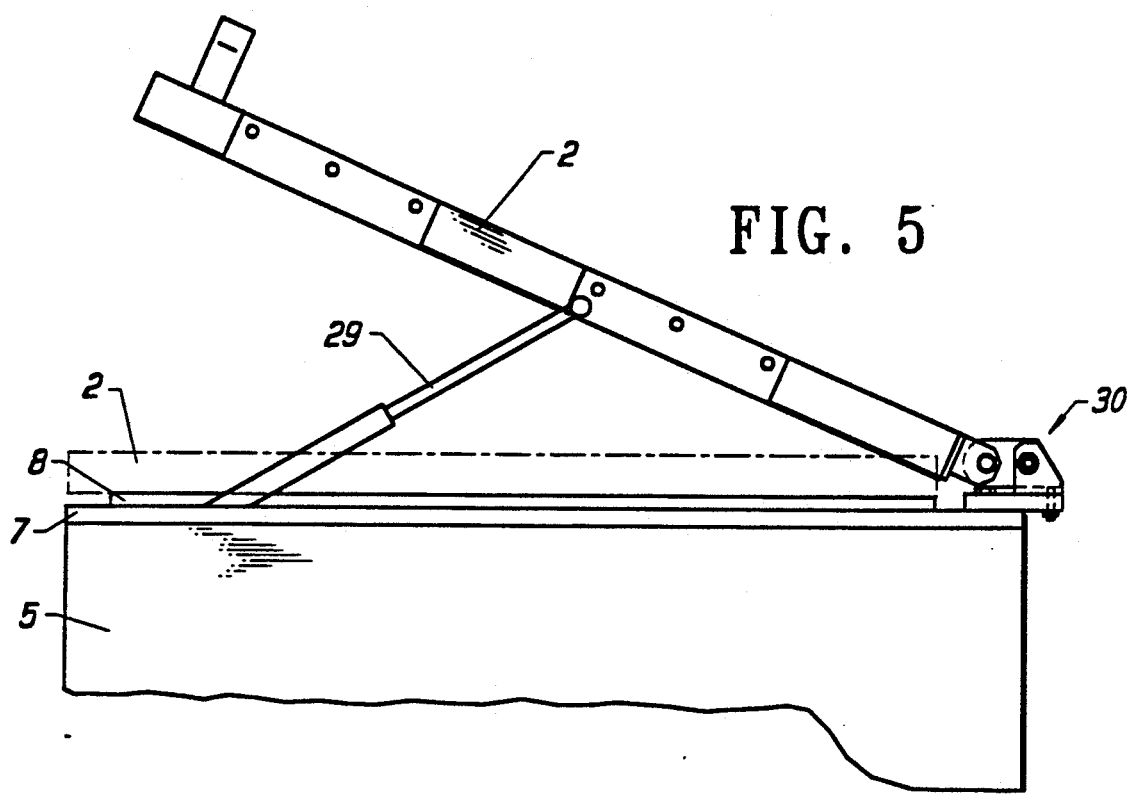
FIG. 5 is a side view of the apparatus, showing the hinge—the view further indicating in broken lines, the placement of the cover after it is lowered before the vacuum is applied.

Referring to FIG. 4, there is shown a back view of the apparatus which depicts the configuration which allows the cover to move with pivotal motion. A common shaft type hinge is part of hinge 30 in that shaft housing 20, which houses shaft 22, is incorporated into the hinge 30. Shaft housing 20 is concentric with shaft 22 whereby shaft 22 is allowed to rotate freely inside shaft housing 20. Shaft 22 is secured to cover 2 by bracket plate 27 which is mounted on cover 2 by screw sockets 28. The pivotal motion of cover 2 is also guided by air pump rods 29 as shown in FIGS. 1 and 5. Air pump rods 29 assist in the guidance of cover 2 in its descent and ascent.

Once cover 2 has been lowered to where glass plate 4 is resting upon rubber seal 8, generally linear motion takes over. FIG. 5 shows cover 2 resting upon rubber seal 8 in phantom. Vacuum means such as vacuum pump 18 (see FIGS. 6 and 7) are provided for removing the air (gas) from between the glass plate 4 and the support surface 7. Rubber seal 8 is used to create an air tight environment between glass plate 4 and support surface 7 so that when air is removed from between glass plate 4 and support surface 7 by vacuum pump 18, the cover 2 and hence glass plate 4 is forced down upon registration board 12, immobilizing graphic material 10 in the process.

Referring to FIG. 2, there is shown a crosssectional view, after cover 2 and glass plate 4 have been lowered pivotally, but before the vacuum pump 18 is engaged. FIG. 2 shows space 15 between glass plate 4 and representative registered graphic mat 'rial 10. FIG. 2 further shows graphic material 10 pla. 'd upon registration board 12 and positioned by registration pins 13.

Figures 6, 7:
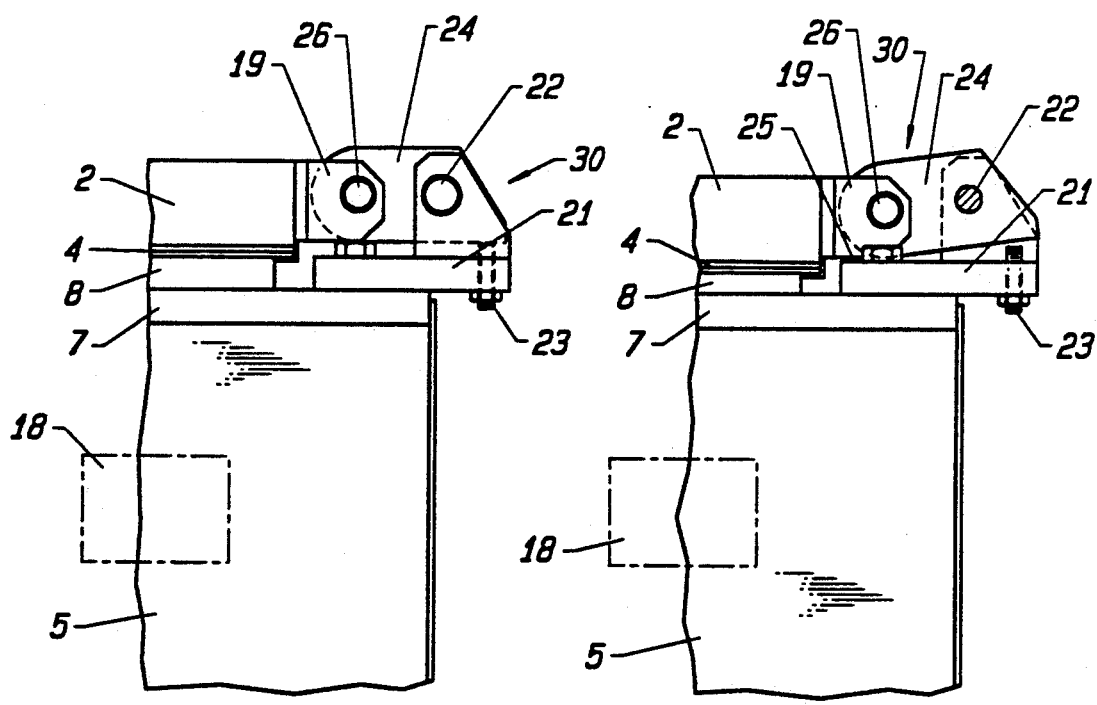
FIG. 6 is a partial side view of the apparatus, showing the hinge before the vacuum is applied.
FIG. 7 is a view similar to that of FIG. 6 showing the hinge after the vacuum is applied.

Referring to FIG. 6, there is shown a partial side view of the vacuum frame apparatus illustrating hinge 30 also before the vacuum pump 18 is applied. Upon evacuation, as cover 2 engages graphic material 10, they are immobilized and sandwiched between cover 2 and registration board 12, whereby the registration of the graphic material 10 is not disturbed.

Upon evacuation of air (gases) from space 15, support surface 7 remains stationary and cover 2 moves nearly linearly and perpendicular to registration board 12. As shown in FIG. 3, the evacuation of air from space 15 results in glass plate 4 being forcefully pressed down against registered graphic material 10, firmly sandwiching the same between glass plate 4 and registration board 12 without disturbing the registration of the graphic materials 10.

The construction of hinge 30 is best illustrated in FIGS. 6 and 7. Hinge 30 utilizes two phases of pivotal motion. The first phase of pivotal motion is depicted in FIG. 5 where the cover is lowered onto the support surface 7 by making contact with rubber seal 8. As stated above, common shaft type hinges, that is, shaft 22, and shaft 26 are incorporated into the hinge 30. Means for connecting hinge 30 to the support surface 7 can be accomplished by hinge mount 21. Shaft 22 is allowed to rotate freely. Shaft 22 is connected to hinge plate 24 which in turn is connected to a second shaft 26. Second shaft 26 is connected to cover 2 by hinge cover connector 19 and is the means for connecting hinge 30 to cover 2. Furthermore, means such as an olite bushing (not shown) mounted concentrically to shaft 22 are provided to restrain side-to-side motion during the opening and the closing of the frame.

Once the cover is resting upon rubber seal 8, as shown in FIG. 6, and a vacuum 18 is applied, as shown in FIG. 7, the cover 2 is forced against the rubber seal 8. FIG. 7 shows that under the initial force of vacuum 18, the second shaft 26 also rotates, in conjunction with shaft 22.

Hinge cover connector 19 and hinge plate 24 never meet as indicated by space 25, thereby avoiding any opportunity for the vacuum seal to be broken by any consequential jarring of hinge 30. Furthermore, while the cover 2 is being forced in the direction of the base 5, mount bolt 23 further prevents a break in the vacuum seal prior to the vacuum draw down by not allowing the portion of link plate 24 adjacent to second shaft 26 to move up instead of moving in its preferred direction, that is, down.

It will be recognized by those skilled in the art that hinge 30 is only one means for accomplishing the function of lowering cover 2 with linear motion perpendicular to a stationary support surface 7. Different structures could be provided to accomplish this function.

Figures 8, 9:
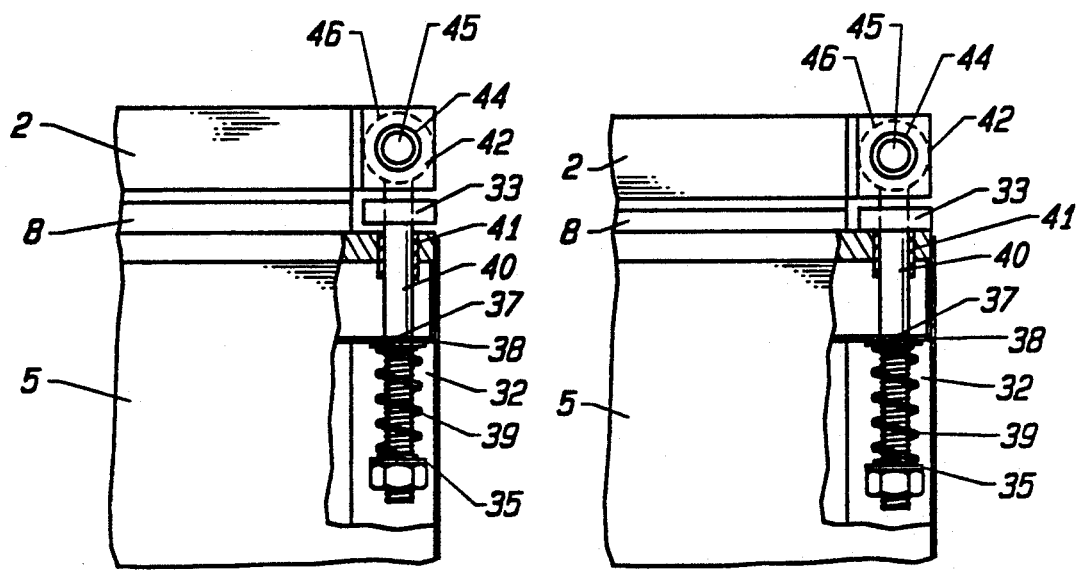
FIG. 8 is a broken away side view of another embodiment of the invention showing a hinge pillar extending from the base to the cover before the vacuum is applied.
FIG. 9 is a broken away side view of embodiment of FIG. 8 the showing the hinge pillar extending from the base to the cover after the vacuum is applied.

An example of another embodiment for lowering cover 2 with linear motion perpendicular to a stationary support surface 7 can be seen in FIGS. 8 and 9 where a hinge pillar 40 is shown. Hinge pillar 40 is housed within base 5 by hinge pillar housing 32 and passes through and intersects mount 37, mount washer 38 and support surface 7. At the lower end of hinge pillar 40, it has a threaded surface 34 that receives a bolt/washer 35 as illustrated. A mount washer 38 presses against the underside of mount 37 where hinge pillar 40 intersects with mount 37. Spring 39, which is placed between bolt/washer 35 and mount washer 38, creates tension to anchor hinge pillar 40 with relative firmness while still allowing hinge pillar 40 to float inside hinge pillar housing 32. Support collar 33 which is concentric with hinge pillar 40, is suspended between cover 2 and base 5.

The means for attaching hinge pillar 40 to cover 2 is shaft 45 housed within shaft housing 42 as part of hinge mount 46 on the top of hinge pillar 40. The means for attaching the hinge pillar to base support surface 7 is housing 32 in base 5. However, it will be recognized by those skilled in the art that other structures could easily be used for attaching hinge pillar 40 to cover 2 and support surface 7.

Referring to FIG. 9, there is shown cover 2 while it is driven down linearly and perpendicularly to support surface 7 whereby rubber seal 8 is compressed under cover 2. The linear motion of cover 2 is guided by hinge pillar 40 as it is driven down, vertically into hinge pillar housing 32 under the force of the vacuum. Hinge pillar bushing 41 facilitates smooth motion of hinge pillar 40. Because support surface 7 remains stationary and cover 2 moves with linear motion perpendicular to support surface, the registration of graphic material 10 is not disturbed.

Figure 10:
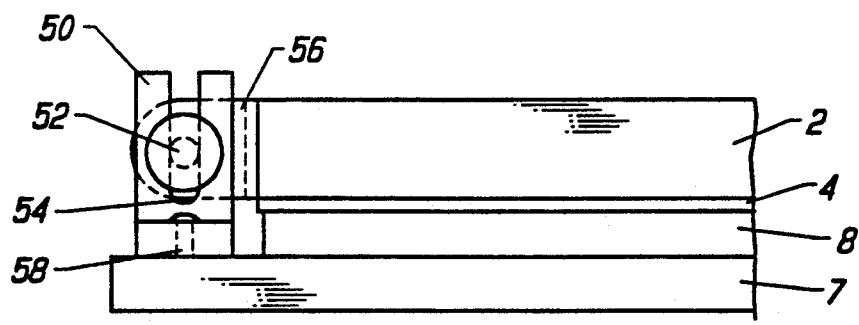
FIG. 10 is a side view of slot hinge embodiment of the invention, showing the same connected to the cover and the base and before the vacuum is applied.

An example of another embodiment for lowering cover 2 with linear motion perpendicular to a stationary support surface 7 is illustrated in FIG. 10 where a slot hinge 50 is shown. Shaft 52 intersects slot hinge 50 wherein shaft 52 is mounted within the slot 54 of slot hinge 50. Shaft 52 is allowed to move up and down within slot 54. Slot hinge 50 is mounted on base 5 whereby bolt 58 is a means for attaching the slot hinge 50 to support surface 7. A means for attaching slot hinge 50 to cover 2 is shaft support 56 which is mounted on cover 2. Shaft 52 floats within slot 54 until a vacuum is applied. When a vacuum is applied, slot hinge 50 guides cover 2, linearly and perpendicular to support surface 7, wherein as glass plate 4 engages graphic material 10, they are immobilized and sandwiched between glass plate 4 and registration board 12, and the registration of the graphic material 10 is not disturbed.

After graphic material 10 has been exposed to light, the vacuum pump 18 is turned off and glass plate 4 is released from forceful contact with graphic material 10.

While the present invention has been described with reference to specific embodiments, the description is illustrative and is not to be construed as limiting the invention. Various modifications may occur to those skilled in the art without departing from the true spirit and scope of the invention as defined by the appended claims.

What is claimed is:

1. A vacuum frame apparatus for maintaining alignment of graphic material to be exposed to light, which graphic material includes a plurality of sheets to be maintained in registration during said exposure, said vacuum frame comprising:
   a base having a surface for supporting said plurality of sheets in registration and having a back portion,
   a cover for maintaining said plurality of sheets in registration on said support surface; and
   means for guiding movement of said cover essentially linearly and perpendicularly relative to said support surface into engagement with said plurality of sheets to sandwich the same between said cover and said support surface without disturbing said registration.

2. A vacuum frame apparatus as recited in claim 1 wherein said movement of said cover is in two opposite directions with a first one of said opposite directions being toward said support surface and a second one of said opposite directions being away from said support surface.

3. A vacuum frame apparatus as recited in claim 1 wherein said base remains stationary and said cover moves.

4. A vacuum frame apparatus as recited in claim 3 wherein said support surface is stationary with respect to said base.

5. A vacuum frame apparatus as recited in claim 3 wherein said plurality of sheets remains stationary with respect to said base.

6. A vacuum frame apparatus as recited in claim 1 wherein said means for guiding movement of said cover relative to said support surface is a hinge connecting said cover to said base.

7. A vacuum frame apparatus as in claim 1 wherein said means for guiding movement of said cover is a plurality of hinges, each of which connects said cover to said base.

8. A vacuum frame apparatus as recited in claim 6 wherein said hinge connecting said cover and said stationary support surface is attached to said rear portion of said base.

9. An vacuum frame apparatus as recited in claim 6 wherein said hinge is a floating hinge.

10. A vacuum frame apparatus as in claim 6 wherein said hinge comprises:
    means for attaching said hinge to said support surface; and
    means for attaching said hinge to said cover.

11. A vacuum frame apparatus as in claim 10 wherein said hinge is adapted to provide both said guiding movement of said cover without disturbing said registration of said plurality of sheets and pivotal guidance of movement of said cover relative to said support surface.

12. A vacuum frame apparatus as in claim 11 wherein said means for causing guiding movement of said cover comprises vacuum means for removing gas from between said cover and said support surface.

13. A method for maintaining the registration of a plurality of sheets of graphic material to be exposed to light while being sandwiched between the support surface of a base and the cover comprising the steps of:
    supporting said registered plurality of sheets on said support surface; and
    guiding movement of said cover essentially linearly and perpendicularly relative to said support surface into engagement with said registered plurality of sheets.

14. A method for maintaining the registration of a plurality of sheets of material to be exposed to light as in claim 13 wherein said step of guiding movement of said cover to support surface includes:
    removing gas from between said cover and said support surface; and
    floating a hinge in the direction of said support surface.

15. A method for maintaining the registration of a plurality of sheets of material to be exposed to light as in claim 12 wherein said step of guiding movement of said cover further includes guiding said guiding movement in two opposite directions with a first one of said opposite directions being toward said base and a second one of said opposite directions being away from said support surface.

* * * * *